Oct. 21, 1947.    D. S. BOND    2,429,257
COUNTER ELECTROMOTIVE FORCE FEEDBACK CIRCUIT
Filed April 1, 1943    2 Sheets-Sheet 1

Inventor
Donald S. Bond
By
Attorney

Oct. 21, 1947.                D. S. BOND                 2,429,257
              COUNTER ELECTROMOTIVE FORCE FEEDBACK CIRCUIT
              Filed April 1, 1943              2 Sheets-Sheet 2
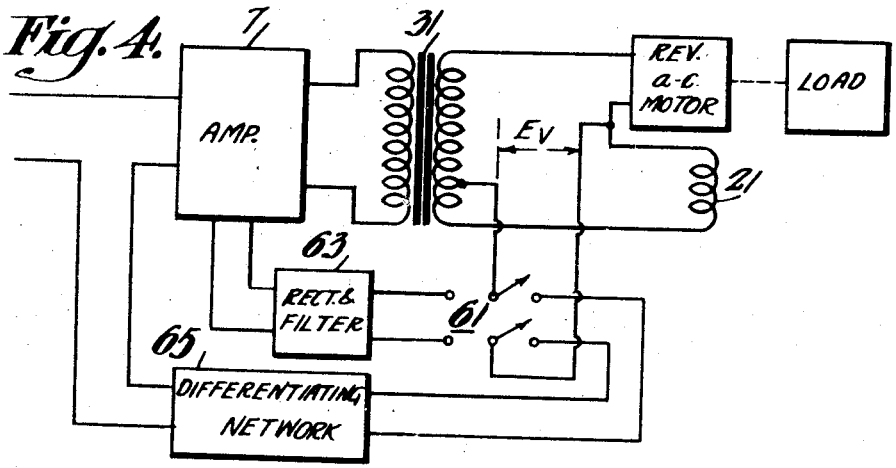
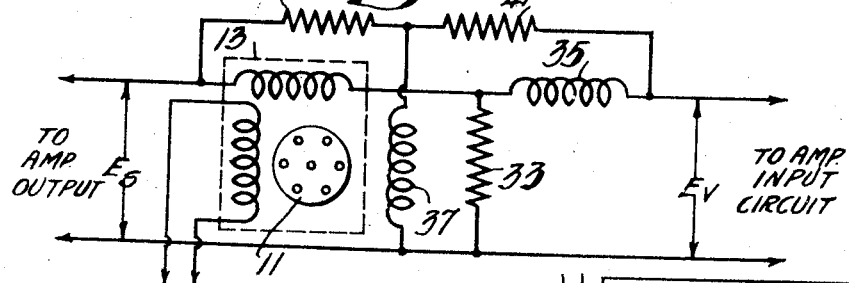
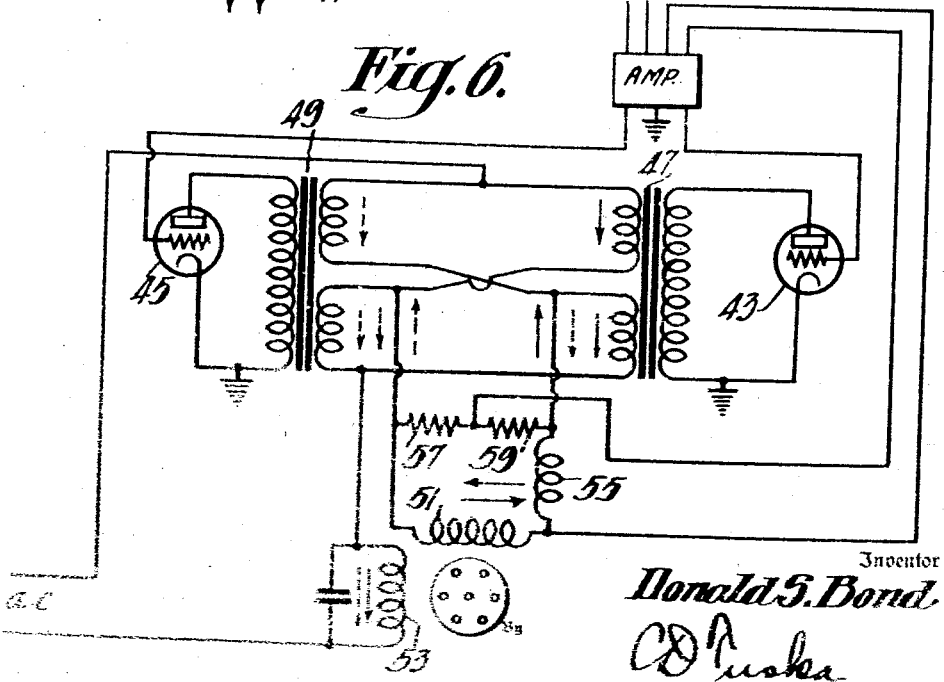
Inventor
Donald S. Bond
Attorney Patented Oct. 21, 1947

2,429,257

UNITED STATES PATENT OFFICE 2,429,257

COUNTERELECTROMOTIVE FORCE FEEDBACK CIRCUIT

Donald S. Bond, Philadelphia, Pa., assignor to Radio Corporation of America, a corporation of Delaware Application April 1, 1943, Serial No. 481,395

3 Claims. (Cl. 318—207)

1

This invention relates to servo systems and more particularly to the prevention of hunting in electrical servo systems or follow-up systems.

An electrical servo system generally comprises a source of control signals, an electric motor, means responsive to the control signal to vary the supply of energy to the motor, and means responsive to the angular position of the motor, or of a load device connected thereto, to reduce the effect of a control signal as the motor drives the load toward a position which is related in some predetermined manner to the original control signal. The effect of the control signal becomes zero when the load reaches the proper position. Owing to inertia, the driven device tends to overshoot or run past the position of zero control signal, requiring a reversed signal to rotate the driven device back to the proper position. If the control sensitivity of the system is reasonably high, overshooting may occur upon reversal, producing another reversal, more overshooting, and consequent sustained oscillation. This effect is known as "hunting" and is a phenomenon which must be minimized or eliminated in the design and construction of any practical servo system. One well known method of hunting prevention is to add to the control signal a further signal which is proportional to the speed of rotation of the driving motor, as set forth in U. S. Patent 2,208,623, issued to D. S. Bond on July 23, 1940.

It is the principal object of this invention to provide an improved method of and means for deriving a velocity-proportional control signal for anti-hunting stabilization for servo systems.

Another object is to provide an improved method of and means for utilizing the driving motor of a servo system as a generator of anti-hunt voltage.

A further object of the invention is to provide an improved anti-hunt system requiring a minimum of auxiliary apparatus.

Figure 1:
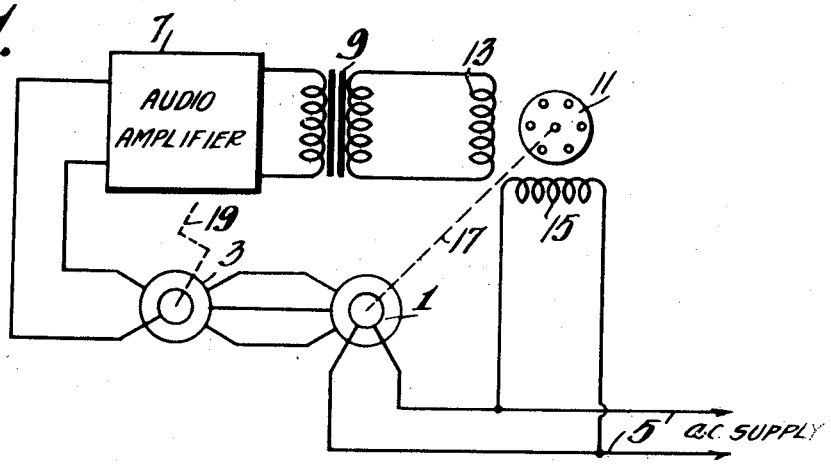
Figure 2:
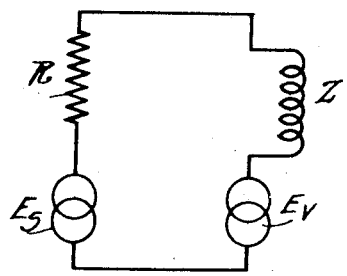
Figure 3:
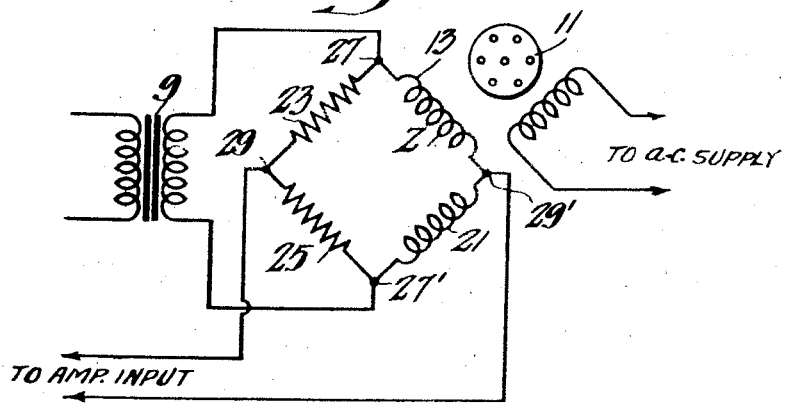

These and other objects will become apparent to those skilled in the art upon consideration of the following description with reference to the accompanying drawing, of which Fig. 1 is a schematic diagram of an electrical follow-up system, Fig. 2 is a schematic diagram of an equivalent circuit of the motor of Fig. 1, Fig. 3 is a schematic diagram of a motor circuit embodying the instant invention, and Figs. 4, 5 and 6 are schematic diagrams of modifications of the system of Fig. 3.

Referring to Fig. 1 a conventional type of follow-up system comprises a pair of "Selsyns" or "synchro transformers" 1 and 3 or other similar devices commonly used in self synchronous systems connected in cascade between an A.-C. source such as the lines 5, and the input circuit of an amplifier 7. The amplifier 7 includes one or more power amplifier tubes, coupled through a transformer 9 or the like to one of the power input circuits of a reversible A.-C. motor 11. The motor 11 is illustrated as a two phase induction motor, with one winding 13 coupled to the amplifier 7 and another winding 15 connected to the A.-C. line 5. The rotor of the motor 11 is mechanically connected as indicated by the dash line 17 to the rotor of the synchro transformer 1. The rotor of the transformer 3 is mechanically connected to a control device such as a manually operable crank 19.

In the operation of the system of Fig. 1, the motor winding 15 is energized constantly. Voltage applied to the input winding of the transformer 1 produces a voltage at the output of the transformer 3 which is related in amplitude to the difference in the angular positions of the rotors of the transformers 1 and 3, and has a polarity with respect to that of the input voltage which depends upon which rotor leads the other. This voltage is amplified by the amplifier 7 and applied to the motor winding 13. Phase shifting means is included in the amplifier 7 or at any other suitable point in the circuit to provide the necessary quadrature relationship between the voltages applied to the windings 13 and 15. Thus the motor 11 tends to maintain the rotor of the transformer 1 in an angular position corresponding to that of the rotor of the transformer 3. If the control device 19 is moved to a new position a signal voltage is applied to the amplifier 7 to cause the motor 11 to run in the proper direction to alter the position of the rotor of the transformer 1 in the same way.

In practical operation the above described system will overshoot and reverse, producing sustained oscillation. Accordingly it is proposed to add a voltage proportional to the angular velocity of the motor 11 to the input to the amplifier 7, utilizing the back E. M. F. of the motor 11. The polarity of this voltage is appropriately related to the direction of rotation of the motor 11 to diminish the tendency for oscillation in accordance with general principles known to those skilled in the art.

Referring to Fig. 2, the generator $E_s$ represents the signal or control voltage, $E_v$ represents the E. M. F. developed by the motor, R represents the internal impedance of the driving amplifier 7 and Z represents the impedance of the motor. In the circuit of Fig. 2 the counter E. M. F. $E_v$ cannot be directly separated from the signal voltage since the two sources are connected in series and are equivalent to a single source producing the algebraic sum of their outputs. In order to separate the counter E. M. F. from the signal voltage the circuit is modified to include the motor impedance Z as one arm of a Wheatstone bridge.

As shown in Fig. 3 an impedance 21 and resistors 23 and 25 are connected to the motor field winding 13. This provides a bridge circuit having conjugate pairs of terminals 27, 27' and 29, 29'. The signal voltage $E_s$ is applied through the transformer 9 to the terminals 27, 27'. The bridge circuit is balanced by adjustment of impedance 21 and the resistors 23 and 25 so that none of the signal voltage appears across the terminals 29, 29' when the motor 11 is at a standstill. When the motor is running the counter E. M. F., $E_v$ appears across the winding 13. A portion of this voltage appears across the terminals 29, 29' and is fed back to the input circuit of the amplifier 7 in accordance with conventional practice to provide anti-hunt stabilization. The elements 21, 23 and 25 may have any desired values subject only to the condition that the bridge circuits be balanced. However, practical considerations dictate that the impedance of the element 21 be relatively small with respect to that of the motor winding 13 so that the major portion of the amplifier output power is delivered to the motor. The resulting attenuation of the feed back voltage $E_v$ may be conveniently and economically compensated by increased voltage gain in the amplifier 7.

Thus in the practice of this invention anti-hunt stabilization for electrical servo systems is provided, by application of the Wheatstone bridge, requiring a minimum of static circuit elements rather than a separate generator or other relatively cumbersome and expensive means for producing a velocity proportional control signal. Although the invention has been described as applied to a servo system employing a two phase induction motor it will be apparent to those skilled in the art that the principles set forth above are equally applicable to a servo system employing any type of electric motor. It is to be understood that the described method of stabilization is not restricted to system of the type shown in Fig. 1, but is equally applicable to self-orienting direction finders exemplified by U. S. Patent 2,314,029, issued to D. S. Bond et al. on March 16, 1943, and in fact to any electrical servo system regardless of how the control signal is derived. It should be noted also that any electrical network having conjugate terminals and capable of being balanced in a manner similar to that characteristic of the Wheatstone bridge may be substituted for the circuit of Fig. 3. For example, the resistors 23 and 25 in the circuit of Fig. 3 may be omitted and a tapped output transformer 31 connected as shown in Fig. 4 to separate the control signal and the counter E. M. F. voltage. The magnitude of the impedance 21 or the tapping point on the secondary of the transformer 31 is adjusted to provide zero output when the motor is stationary.

Fig. 5 shows an alternative circuit employing a parallel T-filter section instead of the bridge circuit of Fig. 3. The output transformer is connected to the motor winding 13 through a resistor 33. The resistor 33 is connected through a reactor 35 to the feedback circuit. The winding 13, resistor 33 and reactor 35 constitute a low pass T-section. This T-section is shunted by high pass section comprising a reactor 37 and a pair of resistors 39 and 41. The two T-sections are designed in accordance with known practice to provide equal attenuations and opposite phase shifts at the frequency of the output voltage of the amplifier. Thus, when the motor 11 is stationary the voltages applied to the feed-back circuit thru the two filter sections cancel each other. When the motor 11 is running, counter E. M. F. is induced in the winding 13. Since the winding 13 is within the T-network, the counter E. M. F. voltage is not balanced through the two transmission paths and although it will be attenuated, a net output proportional to the velocity of rotation of the motor is produced.

Fig. 6 shows a modified motor control circuit comprising two power control tubes 43 and 45 connected to transformers 47 and 49, respectively. Each of the transformers 47 and 49 includes two separate secondary windings. The secondaries are connected in a Wheatstone bridge circuit with one winding 51 of a two-phase induction motor connected to one pair of conjugate terminals thereof and the other winding 53 connected in series with an A.-C. supply thru the other conjugate pair of terminals. A reactor 55 is connected in series with the winding 51 and a pair of resistors 57 and 59 are shunted across the corresponding bridge terminals.

In the operation of the circuit of Fig. 6, the conductivities of the tubes 43 and 45 are varied in opposite directions. For example, if the motor is to run in one direction, the conductivity of the tube 43 is increased, while that of the tube 45 is decreased. The tube 43 will reflect lower impedances in the secondaries of the transformer 47 than are reflected by the tube 45 in the secondaries of the transformer 49. Thus, current will flow through the motor windings 51 and 53 as indicated by the solid arrows. When the motor is to run in the opposite direction, the conductivity of the tube 45 is increased and that of the tube 43 is decreased. The current will then flow through windings as indicated by the dotted arrows. The polarity of the winding 51 is reversed, while that of the winding 53 remains the same as before. The bridge circuit comprising the winding 51 and the elements 55, 57 and 59 is adjusted to balance when the motor is stationary. When the motor is running, the counter E. M. F. induced in the winding 51 is related to the velocity of rotation in the same manner as in the system of Fig. 3, providing a velocity proportional voltage at the conjugate terminals in the same fashion as the circuit of Fig. 3.

The anti-hunt voltages produced by the above described systems may be utilized in any known manner. By way of example, the circuit of Fig. 4 includes a double throw switch, 61, through which the feed-back voltage $E_v$ may be applied either to a rectifier and filter 63 to a gain control circuit of the amplifier 7, or to the signal input circuit of the amplifier 7. With the switch 61 thrown to its left hand position, the gain of the amplifier 7 is regulated in accordance with the velocity of rotation of the motor, providing high gain at low velocity and low gain at high velocity. The rectifier and filter circuit 63 may include delay circuits in accordance with known practice to modify the control characteristic so as to provide maximum stabilization for any particular system. With the switch 61 thrown to its right hand position, the velocity-proportional voltage is added algebraically to the control signal. A differentiating network 65 may be included to provide higher-order components corresponding to the acceleration and deceleration, as described in the above mentioned Bond Patent No. 2,208,623.

I claim as my invention:

1. In a system for producing a voltage related in a predetermined manner to the velocity of rotation of an electric motor which produces a counter E. M. F. depending upon said velocity, said motor including a power input impedance, a parallel T-filter having input and output terminals and comprising high pass and low pass sections connected in parallel between said terminals, a source of power connected to the said input terminals for energizing said motor, the input impedance of said motor constituting one series arm of said low pass section, the electrical constants of said sections being so selected that the voltages applied to the output of said filter by said sections are of equal amplitude and opposite phase when said motor is stationary and the output voltage represents the back E. M. F. of said motor when said motor is rotating.

2. A device of the character described in claim 1 in which said high pass section comprises two resistors connected in series between said input and output terminals and a reactor connected in parallel with said terminals from the junction of said resistors.

3. In a system for producing a voltage related in a predetermined manner to the velocity of rotation of an electric motor which produces a counter E. M. F. depending upon said velocity, said motor including a power input impedance, a parallel T-filter having input and output terminals and comprising a high pass section having resistive series elements and an inductive shunt element and a parallel-connected low pass section comprising inductive series elements and a resistive shunt element, one of said inductive elements constituting the power input impedance of said motor, and a source of power connected to said input terminals for energizing said motor, the electrical constants of said sections being so selected that the voltages applied to the output of said filter by said sections are of equal amplitude and opposite phase when said motor is stationary and the output voltage represents the back E. M. F. of said motor when said motor is rotating.

DONALD S. BOND.

REFERENCES CITED

The following references are of record in the file of this patent:

UNITED STATES PATENTS

| Number | Name | Date |
|---|---|---|
| 1,944,756 | Quarles | Jan. 23, 1934 |
| 2,113,234 | Lee | Apr. 5, 1938 |
| 2,131,759 | Satterlee | Oct. 4, 1938 |
| 2,236,086 | Conover | Mar. 25, 1941 |
| 2,325,092 | Andrews | July 27, 1943 |
| 2,191,997 | Side | Feb. 27, 1940 |
| 2,263,497 | Harrison | Nov. 18, 1941 |